June 20, 1950     F. W. MIRANDI     2,512,167
WARNING DEVICE FOR VEHICLES
Filed Oct. 30, 1946     2 Sheets-Sheet 2
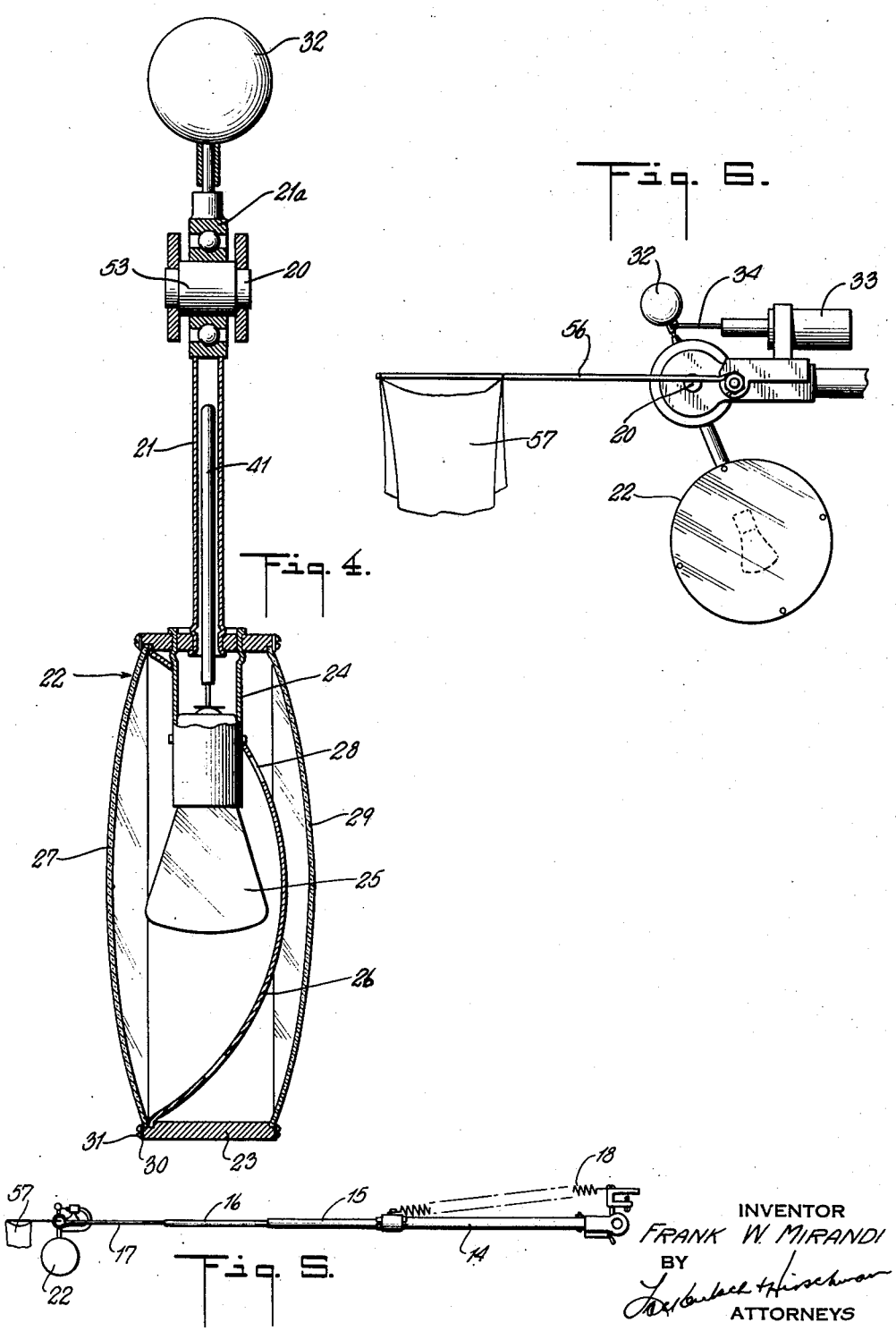

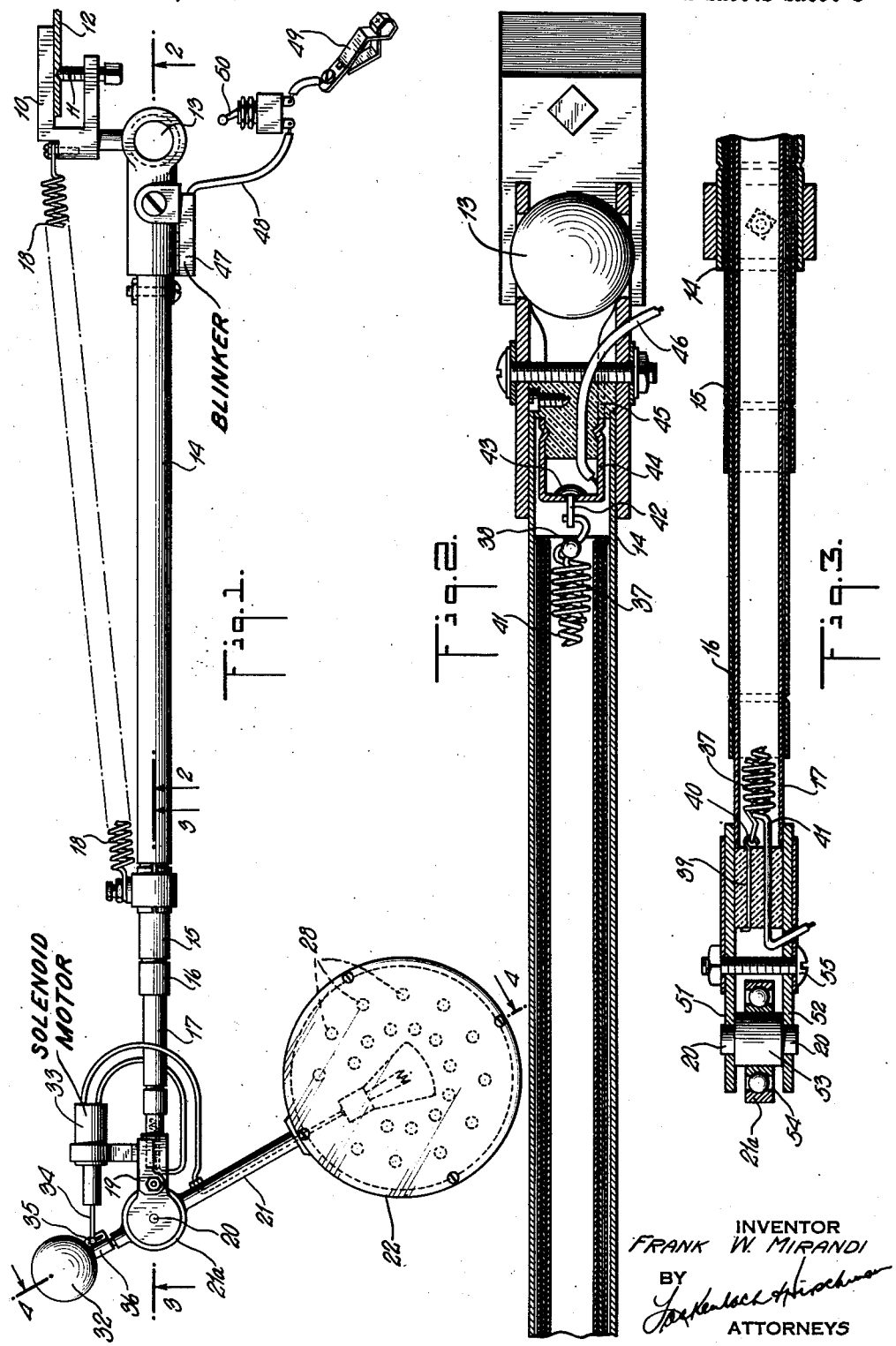

Patented June 20, 1950

2,512,167

UNITED STATES PATENT OFFICE 2,512,167

WARNING DEVICE FOR VEHICLES

Frank W. Mirandi, Yonkers, N. Y., assignor to Eva Mirandi, Yonkers, N. Y.

Application October 30, 1946, Serial No. 706,561

12 Claims. (Cl. 177—329)

The present invention relates to a signalling and warning device for attracting the attention of vehicle drivers to the presence of a person on an exposed or dangerous location, as the presence of an autoist on a highway engaged in repairing a tire or other part of an automobile.

While the invention is applicable to signalling and warning devices of various types and for various purposes, it is of particular advantage for warning oncoming cars of the presence of a stalled automobile on the open road and of the presence of an autoist on such road engaged in making emergency repairs, and it will accordingly be described more in detail in the form of an automobile signalling device.

It is the general object of the invention to provide a signalling device of the character indicated which is visible for long distances by night as well as by day, and which will operate actively to attract the attention of motorists to a stalled car on which one or more persons may be working at the moment.

It is a further object of the invention to provide a signalling device having a colored light facing in the direction of approaching motorists and which at the same time provides a source of white light to aid the autoist in making repairs or tire replacements on the car.

It is also an object of the invention to provide a signalling device which can be attached to various parts of a car, such as the trunk cover, bumper, door or the like, so that the working area to be illuminated can be varied.

It is a still further object of the invention to provide a signalling safety device having a source of light for use at night associated with a warning flag for use in the daytime.

A further object of the invention is to provide a signaling device having extension means whereby the safety zone for the stalled or parked autoist can be varied to suit the needs of the moment, a larger safety zone being available where, for example, a left tire is to be replaced, and a smaller zone when the right tire needs changing.

Other objects and advantages of the invention will appear from the following more detailed description taken in connection with the accompanying drawings, wherein Fig. 1 shows a front view in elevation of a construction in accordance with the invention; Fig. 2 is a partial sectional view along the line 2—2 of Fig. 1; Fig. 3 is a complementary sectional view similar to Fig. 2 and taken along the line 3—3 of Fig. 1; Fig. 4 shows a section taken along line 4—4 of Fig. 1; Fig. 5 shows the mechanism of Fig. 1 in fully extended position; and Fig. 6 is a view showing a warning flag associated with the oscillating light.

Referring to the drawings, my improved signalling mechanism includes a bracket 10 provided with a clamping screw 11 by means of which the device can be secured to a suitable part of an automobile, indicated generally at 12, such as the open trunk cover, a bumper, or any suitable part of the car body. The bracket supports, by way of a universal joint 13, a series of telescoping tubes indicated at 14, 15, 16 and 17 which in use may be either retracted, as shown in Fig. 1, or extended to any desired degree, as shown in Fig. 5, depending upon the safety area required by the motorist while making his repairs on a stalled or parked car. It will be evident that by reason of the universal joint 13, the bracket can be secured at any angle to a part of a car without interfering with the angle at which it is desired that the tubes 14 to 17 extend from the car. The weight of the telescoping tubes and of the parts attached thereto is in part borne by a relatively stiff spring 18 which is anchored at one end to the bracket 10 and at the other to the forward end of the tube 14.

At the forward end of the tubular member 17 there is provided a support 19 for a pivot 20 upon which is mounted an oscillating member 21. The latter is provided at its lower end with a signalling device 22, shown more in detail in Fig. 4. The signalling device includes a casing 23 within which is mounted a socket 24 for an electric lamp 25. To the rear of the lamp is a reflector 26 while forwardly thereof there is positioned a colorless glass plate or lens 27, so as to illuminate the area in which the autoist may be working. The reflector 26 is provided with apertures 28 through which light can travel rearwardly through a colored (preferably red) glass plate or lens 29. The lens 27 is held in place with the aid of a ring 30 secured in position by screws 31, the lens being removable for replacement of the lamp 25. The weight of the signalling device 22 is counterbalanced by a counterweight 32 fixed to an extension of the member 21.

The signalling device 22 is oscillated by means of a solenoid motor 33 of any suitable construction, the armature of the motor being connected by means of a rod 34 and by a pin and slot connection 35 with a collar 36 on the extension of the member 21. It will be understood that the solenoid motor includes mechanism for effecting reciprocation of the armature, but as this mechanism forms no part of the present invention, it need not be described in any further detail.

One of the features of the present invention resides in the means for connecting the solenoid motor and the signalling lamp 25 with the battery of the car. In accordance with the invention the electrical cable connecting the battery with the electrical devices at the farther end of the tube 17 is so arranged that cable is paid out and taken in in a safe and convenient manner and without straining the cable when the telescoping tubes are extended or forming, when the device is retracted, a loop of electric cable exposed to injury and likely to interfere with the work of the autoist. Referring to Figs. 2 and 3, it will be seen that a coil spring 37 is located within the tubes 14 to 17, the outer diameter of the spring being smaller than the inner diameter of the narrowest tube 17. The inner end of the spring is fixed in any suitable manner at the inner end of the tubular member 14 of largest diameter, for example, to an insulator 38 secured to the inner end of an insulated copper cable 41, while its other end is anchored in a plug 39 at the outer end of the tubular member 17 of smallest diameter, as by means of an eye 40 secured to the plug. The coil spring is of such length and pitch that it is all housed within the member 17 when the tubular structure is in the retracted or telescoped condition.

The copper cable 41 is positioned within the cable being preferably wound in a direction opposite to that of the spring 37. Thus, if the spring is wound clockwise, then the copper cable is wound counter-clockwise, as indicated in Figs. 2 and 3; thereby the electric cable is more securely housed within the coil spring, and its own coils do not interlock with the coils of the spring. The cable 41 passes through the plug 39 and is connected with the motor 33 and with the socket of the lamp 25, preferably in parallel where the source of current is the usual low-voltage automobile battery. At its opposite end the cable 41 is connected with a conducting rod 42 which may be the stem of a bolt-like member having a head 43 by means of which contact is maintained with a conducting member 44 secured to an insulating plug 45, the rod or stem 42 passing loosely through an aperture in the member 44 and being capable of rotation therein. As a result, electric contact between the cable 41 and the member 44 is maintained despite rotary movements of the tubular members 14 to 17; while at the same time twisting of the coiled copper conductor is avoided.

The conducting member 44 has attached thereto an electric cable 46 which runs to a blinker unit 47 of any suitable construction, such unit being connected by a conductor 48 to a clamp or other device 49 for connecting the conductor 48 to a source of electric current, such as the battery of the automobile. A switch 50 may be arranged in the conductor 48.

The support for the lamp at the outer end of the tubular member 17 is provided by two plates 51 and 52 secured to opposite sides of the plug 39. These plates provide a support for the stub shafts 20 connected to the spacer block 53 which supports the inner raceway of a circular ball bearing 54, the enlarged annular portion 21a of the member 21 providing the outer raceway. A bolt 55 passes through the plates 51 and 52 and is adapted to receive the looped end of a wire or the like 56 (see Fig. 6) which extends horizontally beyond the lamp structure 22 and is adapted to support at its outer end a warning flag 57. This flag is of particular utility during the day for attracting the attention of approaching motorists.

From the foregoing it will be seen that I have provided a signalling or warning device which can be used both by night and by day and which warns approaching motorists of the clearance they must leave a parked car. While I have shown the lamp as being oscillating in character, in order better to catch the attention of oncoming drivers, it will be recognized that many of the advantages of my invention can be realized even where such lamp is stationary, in which case the solenoid motor or equivalent actuating mechanism can be dispensed with. Other variations from the specific detailed disclosure herein may be resorted to within the scope of the appended claims without departing from the spirit of the invention.

I claim:

1. A signalling or warning device of the character described, comprising a plurality of telescoping tubular members, a clamping mechanism adjacent to the inner end of the tubular member of the largest diameter for securing the device to a support, a universal joint between the clamping mechanism and said tubular member, an electric lamp supported by and pivoted upon the outer end of the tubular member of the smallest diameter, a solenoid motor arranged to oscillate the lamp upon its pivot, means likewise at the outer end of the tubular member of smallest diameter for supporting a warning flag, a spring attached to the clamp and to the outer end of the tubular member of largest diameter for supporting the telescoping tubular members, a coil spring positioned within the tubular members and secured to the inner end of the tubular member of largest diameter and at approximately the outer end of the tubular member of smallest diameter, an electric cable positioned within the coil spring and connected at its outer end to the solenoid motor and lamp, an electrically conducting member disposed at the inner end of the tubular member of largest diameter, a blinker unit located adjacent to said conducting member, an electric conductor connecting the conducting member with the blinker unit, a cable running from the blinker units and provided with means for attaching the same to a source of electric current, said conducting member having an aperture, and a bolt passing loosely through the aperture and free to rotate therein, the inner end of the electric cable being secured to said bolt.

2. A signalling or warning device as set forth in claim 1, wherein the electric lamp is provided with a red lens at one side thereof and with a colorless lens on the other side thereof.

3. A signalling or warning device as set forth in claim 1, wherein the electric lamp is provided with a red lens at one side thereof and with a colorless lens on the other side thereof, the lamp including also a reflector facing in the direction of the colorless lens and provided with apertures through which light from the lamp passes to the red lens.

4. A signalling or warning device of the character described, comprising a plurality of telescoping tubular members, a clamping mechanism adjacent to the inner end of the member of largest diameter for securing the device to a support, a universal joint between the clamping mechanism and said tubular member, an electric lamp supported by and pivoted upon the outer end of the tubular member of smallest diameter, a solenoid motor arranged to oscillate the lamp upon its pivot, a coil spring positioned within the tubular members and secured adjacent to the inner end of the tubular member of largest diameter and at approximately the outer end of the tubular member of smallest diameter, an electric cable positioned within the coil spring and connected at its outer end to the solenoid motor and lamp, a blinker unit located adjacent to the inner end of the tubular member of largest diameter, the electric cable being connected to the blinker unit, and a second electric cable connected to the blinker unit and provided with means for attaching the same to a source of electric current.

5. A signalling or warning device of the character described, comprising a plurality of telescoping tubular members, means adjacent to the inner end of the member of largest diameter for securing the device to a support, an electric lamp supported by and pivoted upon the outer end of the tubular member of smallest diameter, a motor arranged to oscillate the lamp upon its pivot, a coil spring positioned within the tubular members and secured adjacent to the inner end of the tubular member of largest diameter and at approximately the outer end of the tubular member of smallest diameter, an electric cable positioned within the coil spring and connected at its outer end to the motor and lamp, and means connected with such cable for attaching the same to a source of electric current.

6. A signalling or warning device of the character described, comprising a plurality of telescoping tubular members, means adjacent to the inner end of the member of largest diameter for securing the device to a support, an electric lamp supported adjacent to the outer end of the tubular member of smallest diameter, a coil spring positioned within the tubular members and secured at the inner end of the tubular member of largest diameter and at approximately the outer end of the tubular member of smallest diameter, an electric cable positioned within the coil spring and connected at its outer end to the lamp, and means for connecting said cable with a source of electric current.

7. A signalling or warning device, as set forth in claim 9, wherein the electric lamp is provided with a red lens facing in one direction and with a colorless lens facing in the opposite direction, said lamp including a reflector facing in the direction of the colorless lens and provided with apertures through which light passes to the red lens.

8. A signalling or warning device as set forth in claim 6, wherein the electric cable within the coil spring is coiled in a direction opposite to that of the coil spring.

9. A signalling or warning device for parked automobiles, comprising an elongatable member provided at one end with means for detachably securing the same to a part of the automobile so as to cause said member to extend laterally, a joint adjacent to the inner end of the elongatable member whereby said member may be adjusted in a horizontal plane, an electric lamp pivotally supported from the opposite end of the elongatable member, a motor for oscillating the lamp upon its pivot, and an electric cable connected with the motor and lamp and provided with means for connecting the same to a source of electric current.

10. A signalling or warning device for parked automobiles, comprising an elongatable member having clamping means at one end for detachably securing the same to a part of the automobile so as to cause said member to extend laterally, a lamp at the opposite end of the elongatable member, means for varying the light emission while the device is in use to attract the attention of passing motorists, and an electric cable running to the outer end of the said member and provided with means for connecting the same to a source of electric current.

11. A signalling or warning device for parked automobiles comprising an elongatable member having means at one end thereof for detachably clamping the same to a portion of the automobile, an electric lamp supported adjacent to the other end of the elongatable member, an electric conductor for supplying current to the lamp and adapted to be connected to a source of electric current, a colorless lens in front of the lamp, whereby an area forwardly of the lamp is illuminated, a reflector at the rear of the lamp and acting to concentrate the rays forwardly of the lamp, and a colored lens at the rear of the lamp, said reflector being pervious to light, whereby light passes rearwardly thereof and through the colored lens.

12. A device as defined in claim 11, wherein the lamp is supported within a ring on opposite edges of which the lenses are mounted, the reflector being disposed within said ring.

FRANK W. MIRANDI.

REFERENCES CITED

The following references are of record in the file of this patent:

UNITED STATES PATENTS

| Number | Name | Date |
|---|---|---|
| 573,218 | Harris et al. | Dec. 15, 1896 |
| 1,238,848 | Vogel | Sept. 4, 1917 |
| 1,336,795 | Svaigel | Apr. 13, 1920 |
| 1,442,288 | Neahr | Jan. 16, 1923 |
| 1,676,571 | Murphy et al. | July 10, 1928 |
| 1,787,382 | Jones | Dec. 30, 1930 |
| 2,158,973 | Whenham | May 16, 1939 |